US008113305B1

(12) United States Patent
Flowers et al.

(10) Patent No.: US 8,113,305 B1
(45) Date of Patent: Feb. 14, 2012

(54) POWERED PATIENT TRANSPORT VEHICLE

(75) Inventors: Michael J. Flowers, Mantua, NJ (US); Thomas R. Talalaj, Jr., Millville, NJ (US)

(73) Assignee: Flowers IP LLC, Mantup, NJ (US)

( * ) Notice: Subject to any disclaimer, the term of this patent is extended or adjusted under 35 U.S.C. 154(b) by 69 days.

(21) Appl. No.: 12/454,751

(22) Filed: May 22, 2009

Related U.S. Application Data

(60) Provisional application No. 61/128,556, filed on May 22, 2008.

(51) Int. Cl.
*B60K 1/00* (2006.01)

(52) U.S. Cl. ....................... 180/19.1; 180/19.2; 180/19.3

(58) Field of Classification Search .............. 180/19.1–3
See application file for complete search history.

(56) References Cited

U.S. PATENT DOCUMENTS

| | | | | | |
|---|---|---|---|---|---|
| 3,802,524 | A | * | 4/1974 | Seidel | 180/6.5 |
| 4,199,036 | A | * | 4/1980 | Wereb | 180/6.5 |
| 4,386,672 | A | * | 6/1983 | Coker | 180/13 |
| 4,570,739 | A | * | 2/1986 | Kramer | 180/216 |
| 4,909,525 | A | * | 3/1990 | Flowers | 280/30 |
| 5,016,720 | A | * | 5/1991 | Coker | 180/13 |
| 5,050,695 | A | * | 9/1991 | Kleinwolterink, Jr. | 180/13 |
| 5,125,468 | A | * | 6/1992 | Coker | 180/13 |
| 5,494,126 | A | * | 2/1996 | Meeker | 180/13 |
| 5,592,997 | A | * | 1/1997 | Ball | 180/65.1 |
| 5,651,422 | A | * | 7/1997 | Casali | 180/13 |
| 5,927,414 | A | * | 7/1999 | Kan et al. | 180/19.3 |
| 5,984,333 | A | * | 11/1999 | Constantijn et al. | 280/250.1 |
| 6,095,269 | A | * | 8/2000 | Hosaka et al. | 180/65.6 |
| 6,491,122 | B2 | * | 12/2002 | Leitner et al. | 180/65.8 |
| 6,702,051 | B2 | * | 3/2004 | Chu et al. | 180/13 |
| 6,729,422 | B2 | * | 5/2004 | Chu et al. | 180/13 |
| 6,860,347 | B2 | * | 3/2005 | Sinclair et al. | 180/11 |
| 6,910,543 | B2 | * | 6/2005 | Kanno et al. | 180/65.1 |
| 7,004,272 | B1 | * | 2/2006 | Brown et al. | 180/65.1 |
| 7,021,407 | B2 | * | 4/2006 | Ruschke et al. | 180/11 |
| 7,117,967 | B2 | * | 10/2006 | Kidd et al. | 180/209 |
| 7,174,093 | B2 | * | 2/2007 | Kidd et al. | 388/811 |
| 7,219,754 | B2 | * | 5/2007 | Johnson | 180/19.2 |
| 2007/0278767 | A1 | * | 12/2007 | Aubert | 280/642 |

* cited by examiner

*Primary Examiner* — Joanne Silbermann
*Assistant Examiner* — Michael Stabley
(74) *Attorney, Agent, or Firm* — Frijouf, Rust & Pyle P.A.

(57) ABSTRACT

A powered patient transport vehicle is disclosed having an improved motion control comprising a frame extending between a first end and a second end. A first and a second caster wheel are located in proximity to the first end of the frame. A first and a second drive wheel are located in proximity to the second end of the frame. A motor drives the first and second drive wheels through a differential gearbox. An electronic control has a control lever for controlling the speed, direction and braking of the motor. A seat is mounted to the frame for transporting an occupant. A steering bar is coupled to the powered patient transport vehicle for steering the powered patient transport vehicle.

6 Claims, 11 Drawing Sheets

POWERED PATIENT TRANSPORT VEHICLE

CROSS-REFERENCE TO RELATED APPLICATIONS

This application claims benefit of U.S. Patent Provisional application No. 61/128,556 filed May 22, 2008. All subject matter set forth in provisional application No. 61/128,556 filed May 22, 2008 is hereby incorporated by reference into the present application as if fully set forth herein.

BACKGROUND OF THE INVENTION

1. Field of the Invention

This invention relates to vehicles and more particularly to a powered patient transport vehicle having an improved motion control.

2. Background of the Invention

Attendant operated patient transport vehicles may be characterized as either a manual wheelchair type or a powerchair personal mobility vehicle type with a joystick attendant control. Each of these transport vehicles has certain advantages and disadvantages.

A conventional manual wheelchair was not originally designed or intended to be pushed by an attendant or a caregiver. The handles for pushing a conventional manual wheelchair are poorly designed from an ergonomic standpoint for pushing by an attendant or a caregiver. Many attendants and caregivers incur back, neck, leg and carpal tunnel injuries from pushing a conventional manual wheelchair. Since many of the caregivers are spouses of an elderly disabled person, the spouses are at higher risk for heart attacks and accidental falls that can cause serious injury to both the attendant and wheelchair occupant.

The manual brakes of a conventional manual wheelchair are located on the front of the manual wheelchair and designed as parking brakes. Frequently, the attendant/caregiver fails to engage the parking brakes of a conventional manual wheelchair when the occupant is getting on or off of the conventional manual wheelchair that leads to further injuries. Furthermore, since the parking brakes are located on the front of the manual wheelchair, an attendant cannot engage the parking brakes while the wheelchair is in motion such as descending a ramp.

A powerchair personal mobility vehicle typically comprises a short frame having plural drive wheels and plural casters or idler wheels. The plural drive may be either front or the rear drive wheels with the caster or idler wheels providing the stability for the powerchair. The plural drive wheels are independently driven by plural electric motors. The plural electric motors are independently controlled by a control for independently driving the plural electric motors.

A joystick operates the control for controlling both the turning, speed, direction and braking of the powerchair. The turning of the powerchair is accomplished by a differential in speed between the plural independently driven electric motors. The control also enables one of the plural electric motors to have a reverse rotation relative to the other of the plural electric motors. The powerchair personal mobility vehicle is well suited for confined areas such as inside use due to the short frame and the superior turning radius of the plural independently driven electric motors. The short wheelbase provides a reduced turning radius for the personal mobility vehicle for negotiating smaller confined spaces indoors.

A scooter type personal mobility vehicle has been available for use by an occupant. A scooter personal mobility vehicle typically comprises an elongated frame having front wheel and plural rear wheels. The front wheel is pivotably mounted on the front portion of the elongated frame. A tiller and handlebar is provided for pivoting the front wheel for steering the personal mobility vehicle. The plural rear wheels are mounted on a common shaft driven by a single electric motor. The electric motor is controlled by a variable speed control and a forward and reverse located on the handlebar of the scooter. The scooter type personal mobility vehicle is well suited for unconfined areas such as outside use due to the superior ride of the elongated wheelbase of the scooter. The elongated wheelbase provides more stability and a better ride for the scooter personal mobility vehicle.

Typically, the cost of a powerchair personal mobility vehicle is greater than the cost of a scooter personal mobility vehicle due to the cost of plural electric motors in addition to the increased cost of a joystick operated dual-motor differential control relative to the single motor speed control of the scooter personal mobility vehicle.

Some powerchairs of the prior art were available with an optional primary or secondary joystick control for enabling an attendant or a caregiver to operate the powerchair from behind the seat of the powerchair. Unfortunately, it is difficult to operate a joystick of a powerchair vehicle while walking behind the seat of the powerchair. Because of the cost of a secondary joystick and the difficulty in operating the joystick control of the powerchair from behind the seat, the use of these optional attendant joysticks have not find widespread use in the art.

It is an object of the present invention to provide a powered patient transport vehicle that overcomes the inadequacies of the prior art vehicles and provides significant advancement in the patient transport art.

Another object of this invention is to provide a powered patient transport vehicle with maneuverability commensurate with a powerchair.

Another object of this invention is to provide a powered patient transport vehicle at cost significantly less than a powerchair.

Another object of this invention is to provide a powered patient transport vehicle with an improved motion control.

Another object of this invention is to provide a powered patient transport vehicle with an improved motion control that does not substantially increase the weight of the powered patient transport vehicle.

Another object of this invention is to provide a powered patient transport vehicle with an improved motion control that is easier to use while walking behind the powered vehicle.

Another object of this invention is to provide a powered patient transport vehicle with a motion control that may be controlled by the occupant of the powered patient transport vehicle.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with specific embodiments being shown in the attached drawings. For the purpose of summarizing the invention, the invention relates to a powered patient transport vehicle having an improved motion control comprising a frame extending between a first end and a second end. A first and a second caster wheel are located in proximity to the first end of the frame. A first and a second drive wheel are located in proximity to the second end of the frame. A motor drives the first and second drive wheels through a differential gearbox. An electronic control has a control lever for controlling the speed, direction and breaking of the motor. A seat is mounted to the frame for transporting an occupant. A steering bar is coupled to the powered patient transport vehicle for steering the powered patient transport vehicle.

In another example of the invention, the invention relates to a powered patient transport vehicle having an improved motion control comprising a frame extending between a first end and a second end. A first and a second caster wheel are located in proximity to the first end of the frame. A first and a second drive wheel are located in proximity to the second end of the frame. A motor drives the first and second drive wheels through a differential gearbox. A control regulates the speed, direction and braking of the motor. A seat is mounted to the frame for transporting an occupant. A steering bar is secured to the frame for enabling an attendant to control and steer the powered patient transport vehicle with the occupant therein.

In still another example of the invention, the invention relates to a powered patient transport vehicle having an improved motion control comprising a frame extending between a first end and a second end. A first and a second caster wheel are located in proximity to the first end of the frame. A first and a second drive wheel are located in proximity to the second end of the frame. A motor drives the first and second drive wheels through a differential gearbox. A control regulates the speed and direction of the motor. A seat is mounted to the frame for transporting an occupant. A tiller is secured to one of the first and second caster wheels for enabling the occupant to operate the control and to turn the powered patient transport vehicle.

In a further example of the invention, a steering bar comprises an upstanding portion extending between a lower end and an upper end with the lower end of the upstanding portion being secured to the powered patient transport vehicle. A handlebar secured to the upper end of the upstanding portion for enabling an attendant to control and steer the powered patient transport vehicle with the occupant therein. The upstanding portion and the handlebar enable an attendant to pull on the handlebar for rotating the power patient transport vehicle about the first and second drive wheels to raise the first and second caster wheels to overcome an elevated obstruction.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 2:
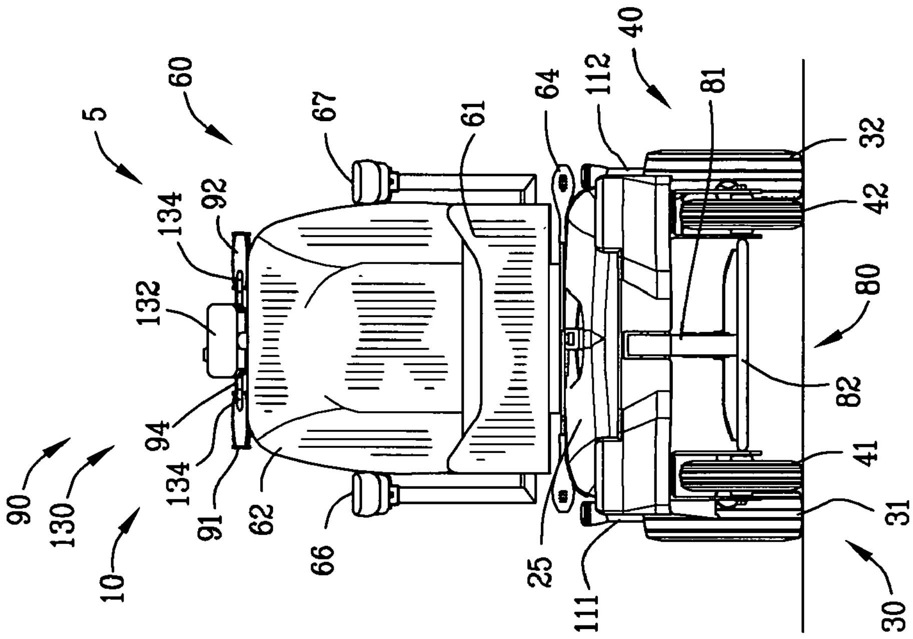
FIG. 2 is a front view of FIG. 1.

FIGS. 1-5 are various views of a powered patient transport vehicle 5 incorporating an improved motion control 10 of the present invention. The powered patient transport vehicle 5 comprises a frame 20 extending between a first frame end 21 and a second frame end 22. The first frame end 21 and the second frame end 22 define an intermediate frame portion 23 of the frame 20. The frame 20 of the powered patient transport vehicle 5 is covered by a covering 25 for overlaying interior portions of the powered patient transport vehicle 5 and for enhancing the attractiveness of the powered patient transport vehicle 5.

Figure 4:
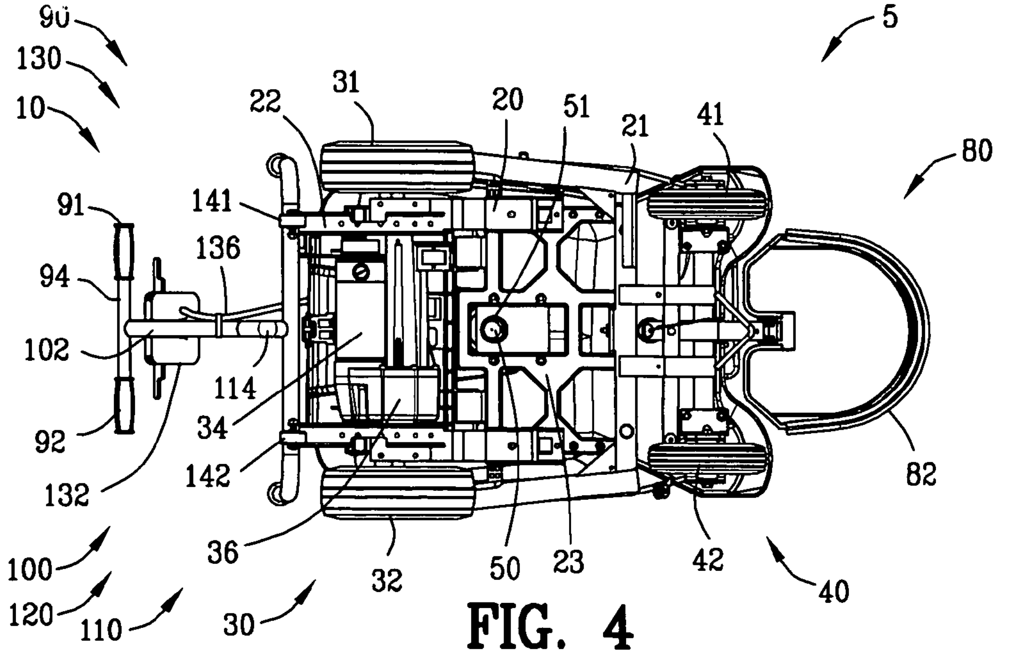
FIG. 4 is a bottom view of FIG. 1.

As best shown in FIG. 4, the powered patient transport vehicle 5 comprises a drive wheel assembly 30 comprises a right and a left drive wheel 31 and 32 located in proximity to the second end 22 of the frame 20. A single drive motor 34 drives the right and left drive wheels 31 and 32 through a differential gearbox 36. The differential gearbox 36 enables one of the right and left drive wheels 31 and 32 to rotate faster than the other of the right and left drive wheels 31 and 32 during a turn of the powered patient transport vehicle 5 as should be well known to those skilled in the art.

A caster wheel assembly 40 is located in proximity to the first frame end 21 of the frame 20. The caster wheel assembly 40 comprises a right and a left caster wheel 41 and 42. The right and left caster wheels 41 and 42 are shown as right and left caster wheels mounted by swivels to the first frame end 21 of the frame 20.

A pedestal 50 extends between a lower end 51 and an upper end 52 in a substantially vertical orientation. The lower end 51 of the pedestal 50 is secured to the intermediate frame end 33 of the frame 20. An upper end 52 of the pedestal 50 extends upwardly for supporting a chair assembly 60. The upper end 52 of the pedestal 50 defines an internal aperture 55 within the pedestal 50

The chair assembly 60 comprises a chair portion 61 and a backrest portion 62. In this example, the backrest portion 62 is pivotally mounted to the chair portion 61 by a pivot 63 for accommodating for the size and comfort of an occupant.

The chair assembly 60 is rotatably mounted on the pedestal 50 with the rotation of the chair assembly 60 being controlled by a lever 64. The chair assembly 60 includes a rotation shaft 65 receivable within the internal aperture 65 of the pedestal 50 for rotatably mounting chair assembly 60 on the pedestal 50. The rotation of the chair assembly 60 facilitates the ingress and egress of an occupant 70 from the powered patient transport vehicle 5. Plural armrests 66 and 67 are secured to the chair portion 61 of the chair assembly 60. A rotational chair assembly 60 suitable for use with the present invention is more fully set forth in U.S. Pat. No. 6,361,111 which is incorporated by reference into the present application.

Figure 1:
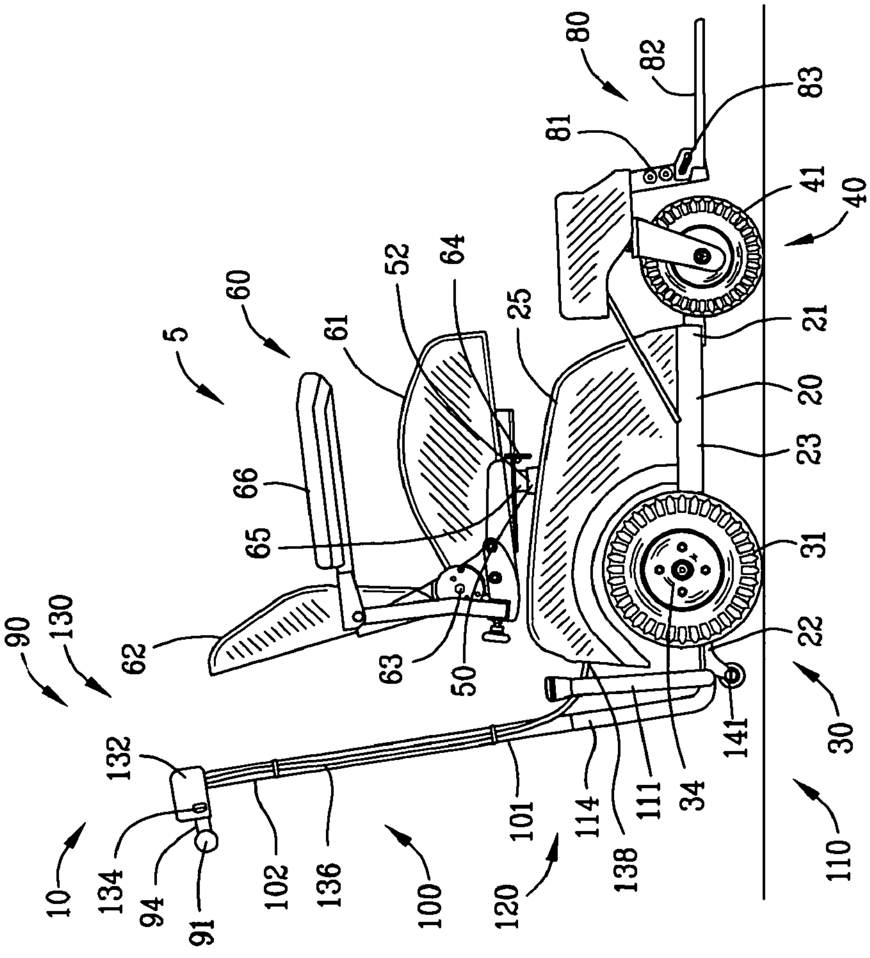
FIG. 1 is a side view of a powered patient transport vehicle incorporating an improved motion control of the present invention.
Figure 3:
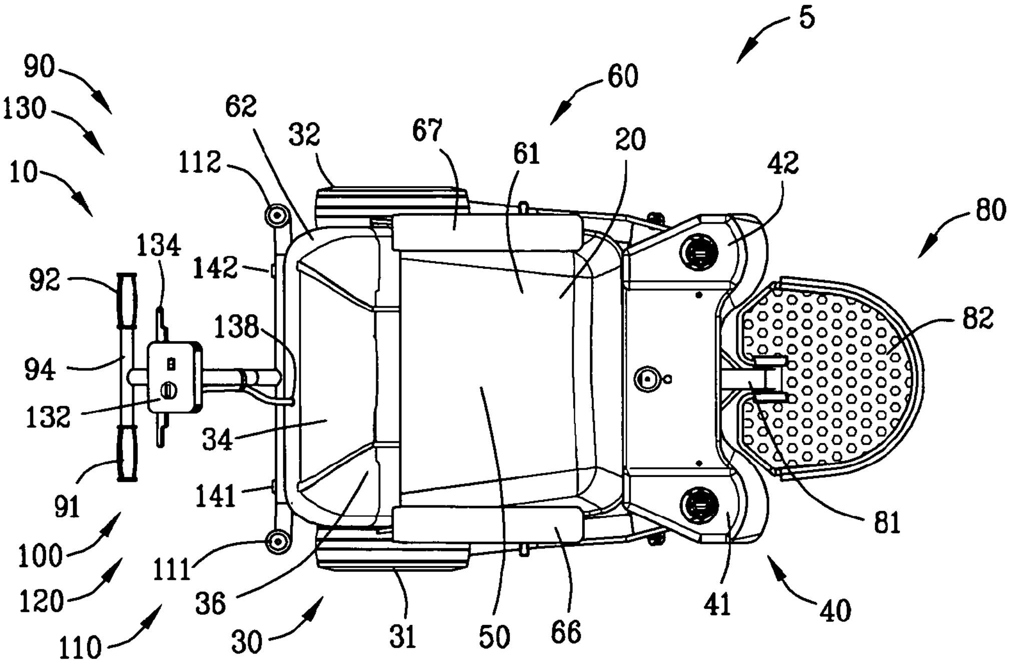
FIG. 3 is a top view of FIG. 1.

A footrest assembly 80 is located on the first end 21 of the frame 20. The footrest assembly 80 comprises a footrest base 81 secured to the first end 21 of the frame 20. A footrest plate 82 mounted to the footrest base 81 by a pivot 83 enabling the footrest plate 82 to be pivoted between a operative position, wherein the first footrest plate 82 is disposed in a generally horizontal position as shown in FIG. 1 and an inoperative position wherein the footrest plate 82 is disposed in a generally vertical position (not shown). The footrest plate 82 provides a footrest for the occupant 70.

A steering bar 90 is secured to the powered patient transport vehicle 5 for controlling the turning direction and speed of the powered patient transport vehicle 5. In this embodiment, the steering bar 90 comprises a right end 91 and a left end 92 defining a handlebar 94. An upstanding portion 100 extends between a lower end 101 and an upper end 102. The handlebar 94 is secured to the upper end 102 of the upstanding portion 100 with the right and left ends 91 and 92 extending outwardly therefrom. The lower end 101 of the upstanding portion 100 is secured to a frame mounting 1111 through a coupling 120. The right and left end 91 and 92 of the handlebar 94 are fixed relative to the frame 20 for enabling the attendant 72 to turn the powered patient transport vehicle 5.

An electronic control 130 includes a control console 132 having a control lever 134 located on the steering bar 90 for controlling the speed and direction of the drive motor 34. Preferably, the electronic control 130 incorporates a forward direction speed function, a reverse direction speed function, as well as, a braking function of the drive motor 34.

The frame mounting 110 comprises a first and a second attachment member 111 and 112 secured to the second end 22 of the frame 20. An intermediate member 113 interconnects the first and second attachment members 111 and 112. The intermediate member 113 supports the coupling 120 for connecting the steering bar 90 to the powered patient transport vehicle 5.

The coupling 120 comprises a lower coupling portion 121 and an upper coupling portion 122. The lower coupling portion 121 is secured to the intermediate member 113 of the frame mounting 110 whereas the upper coupling portion 122 is defined in the lower end 101 of the upstanding member 100.

Figure 6:
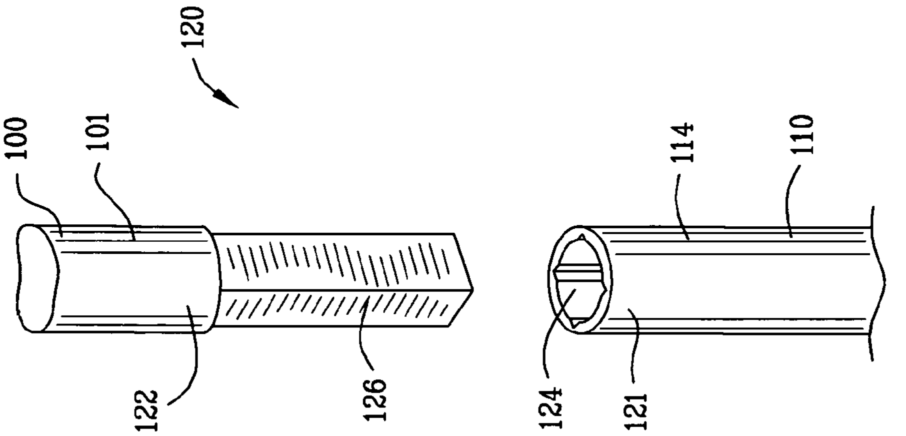
FIG. 6 is an enlarged isometric view of a frame coupling for connecting a steering and control bar to the powered patient transport vehicle.
Figure 5:
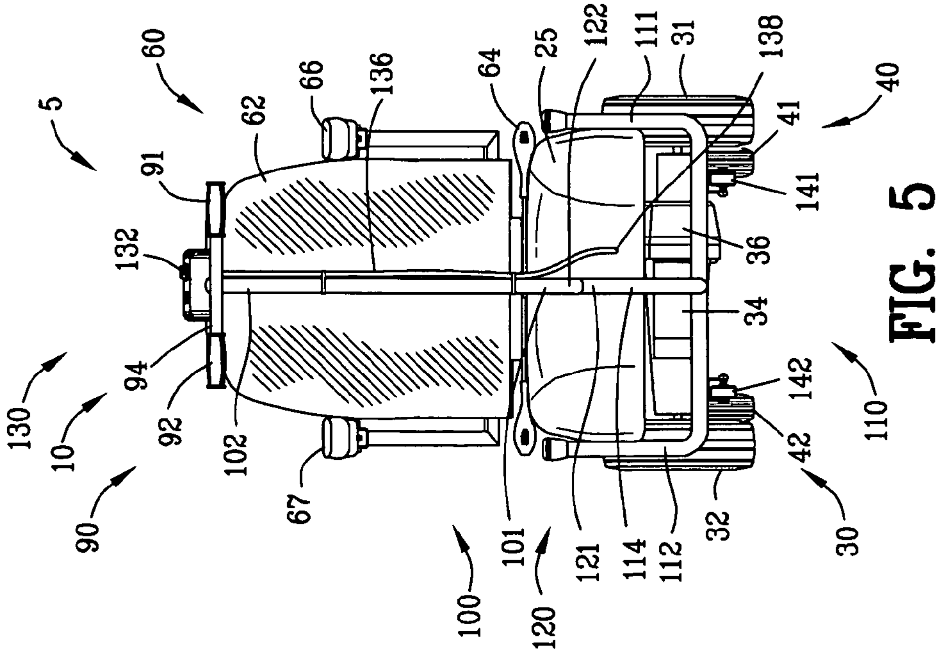
FIG. 5 is a rear view of FIG. 1.

FIG. 6 is an enlarged isometric view of the coupling 120 for connecting the steering bar 90 to the powered patient transport vehicle 5. In this example, the lower coupling portion 121 comprises a keyed aperture 124 whereas the upper coupling portion 122 comprises a keyed insert 126. The keyed insert 126 is insertable into the keyed aperture 124 for connecting the steering bar 90 to the powered patient transport vehicle 5. Although the coupling 120 has been shown as a keyed aperture 124 and a keyed insert 126, it should be appreciated by those skilled in the art that various types of coupling may be used connecting the steering bar 90 to the powered patient transport vehicle 5.

Figure 7:
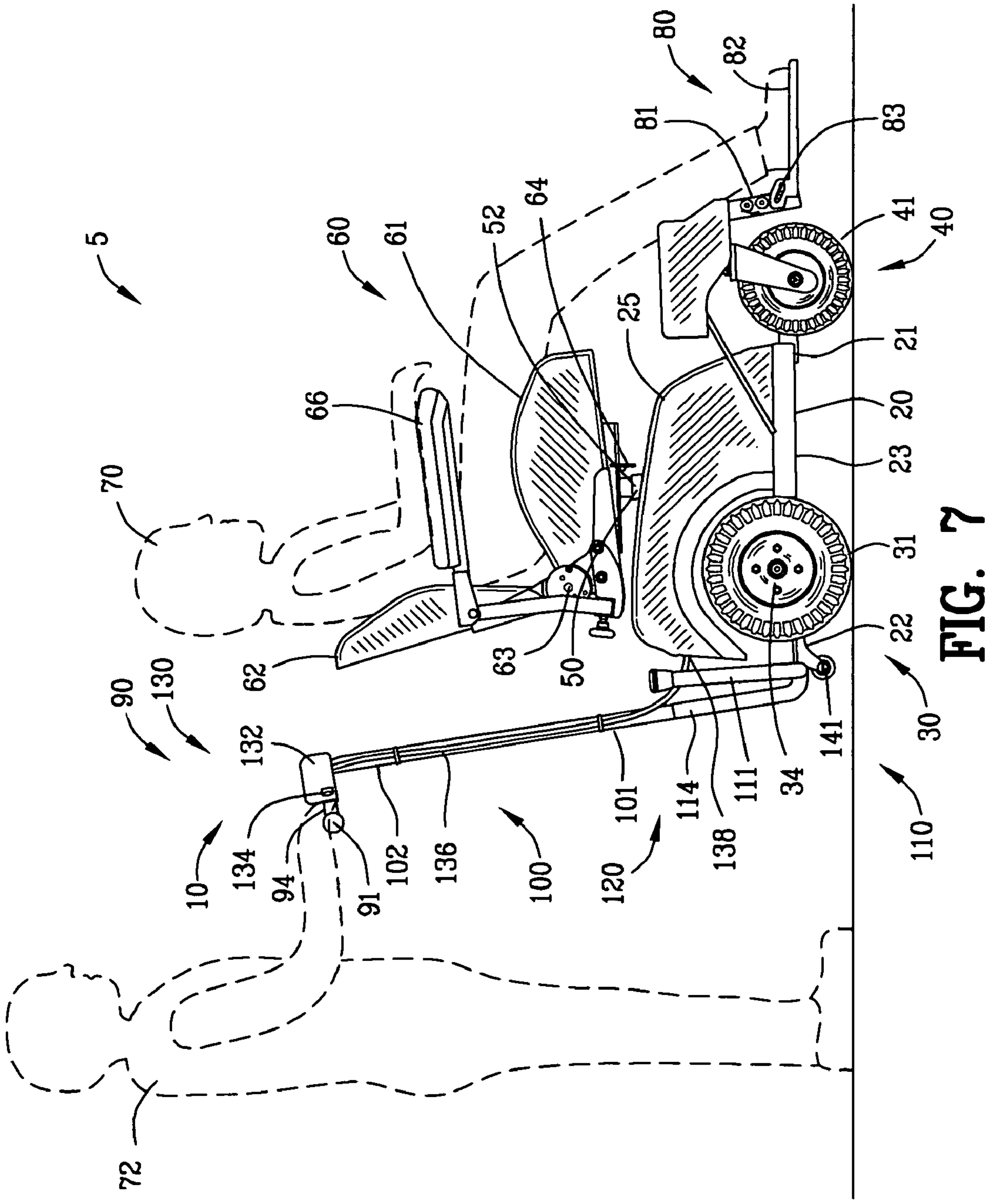
FIG. 7 is a side view similar to FIG. 1 illustrating an occupant seated in the powered patient transport vehicle with an attendant controlling the powered patient transport vehicle.

FIG. 7 is a side view similar to FIG. 1 illustrating an occupant 70 seated in the powered patient transport vehicle 5 with an attendant 72 controlling the speed, direction and braking of the powered patient transport vehicle 5.

Figure 7A:
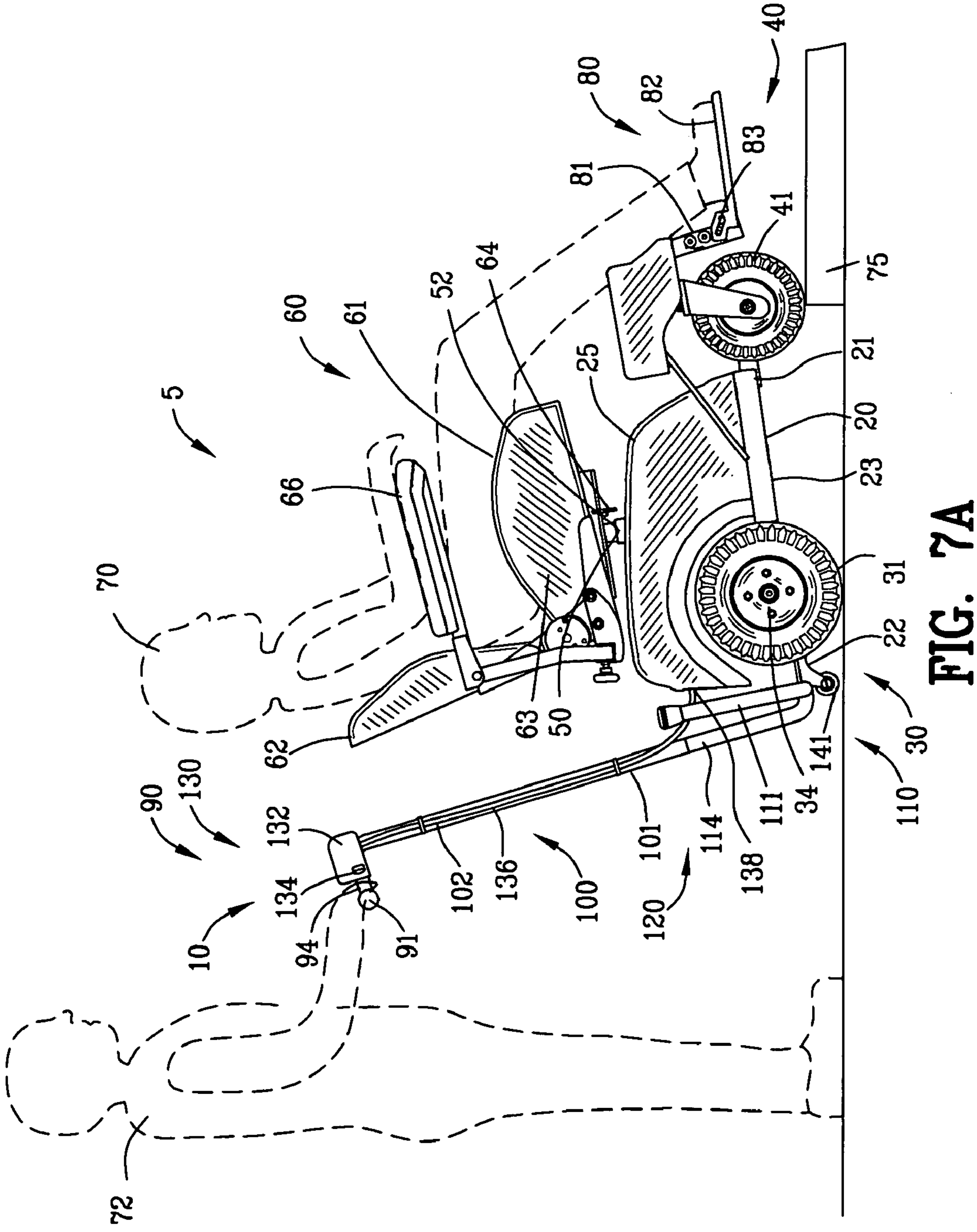
FIG. 7A is a side view similar to FIG. 7 illustrating the tilting of the powered patient transport vehicle with the steering bar for overcoming an elevated obstruction shown as a curb.

FIG. 7A is a side view similar to FIG. 7 illustrating the tilting of the powered patient transport vehicle 5 with the steering bar 90 for overcoming an elevated obstruction 75 such as a curb and the like. The attendant 72 push downwardly on the steering bar 90 for rotating the power patient transport vehicle 5 about the drive wheels 31 and 32. The rotation of the power patient transport vehicle 5 about the drive wheels 31 and 32 raises the caster wheels 41 and 42 above the height of the elevated obstruction 75. Once the caster wheels 41 and 42 have been raised above the level of the elevated obstruction 75, the powered patient transport vehicle 5 may be powered over the elevated obstruction 75 through the powered drive wheels 31 and 32. Rear caster wheels 141 and 142 are provided for limiting the rotation of the power patient transport vehicle 5 about the drive wheels 31 and 32. In one example, rear caster wheels 141 and 142 positions 1 inch above a ground surface permits a raising of the caster wheels 41 and 42 of 3 inches above a ground surface. This type of overcoming an elevated obstruction 75 is impossible for either a scooter or a powerchair personal mobility vehicle without significant discomfort for the occupant.

Figure 8:
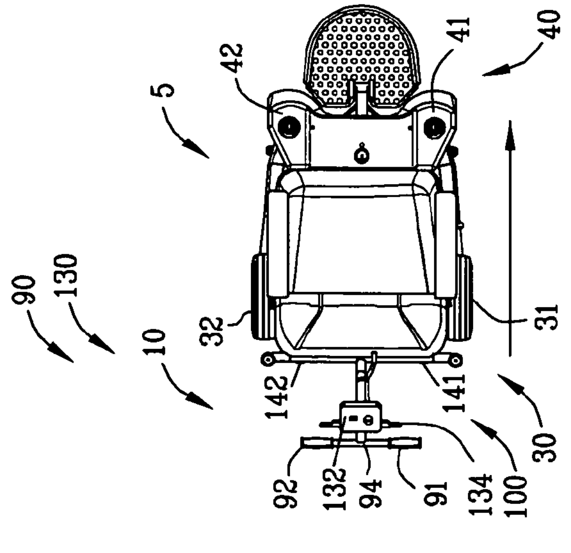
FIG. 8 is a top view of the powered patient transport vehicle of FIGS. 1-7 illustrating equal forces applied to the steering bar of the powered patient transport vehicle for directing the personal mobility vehicle in a straight direction.

FIG. 8 is a top view of the powered patient transport vehicle 5 of FIGS. 1-7 illustrating equal forces applied to the handlebar 94 of the powered patient transport vehicle 5 by the attendant 72 for directing the powered patient transport vehicle 5 in a straight direction.

Figure 9:
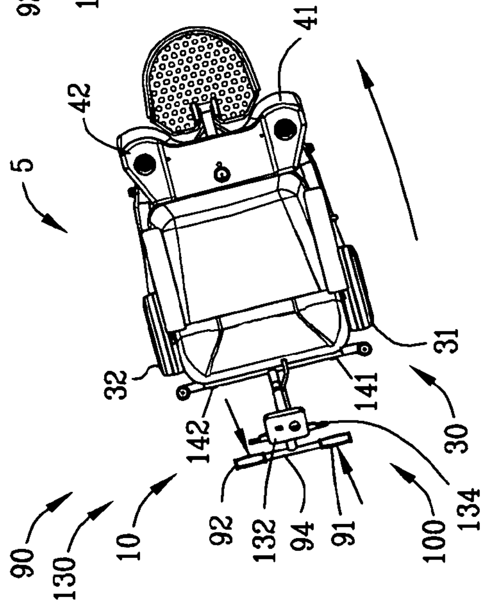
FIG. 9 is a top view similar to FIG. 8 illustrating unequal forces applied to the steering bar of the powered patient transport vehicle for turning the powered patient transport vehicle.

FIG. 9 is a top view similar to FIG. 8 illustrating unequal forces applied to the handlebar 94 of the powered patient transport vehicle 5 by the attendant 72 for turning the powered patient transport vehicle 5.

Figure 10:
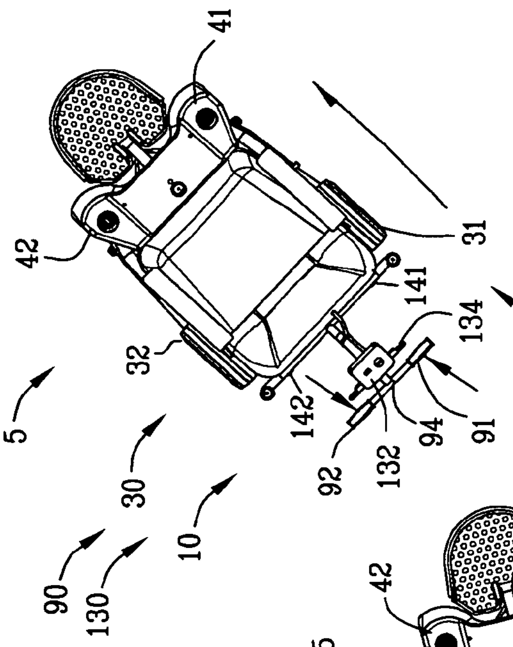
FIG. 10 is a top view similar to FIG. 9 illustrating continued unequal forces applied to the steering bar of the powered patient transport vehicle for continued turning the powered patient transport vehicle.

FIG. 10 is a top view similar to FIG. 9 illustrating continued unequal forces applied to the handlebar 94 of the powered patient transport vehicle 5 by the attendant 72 for continued turning the powered patient transport vehicle 5.

Figure 11:
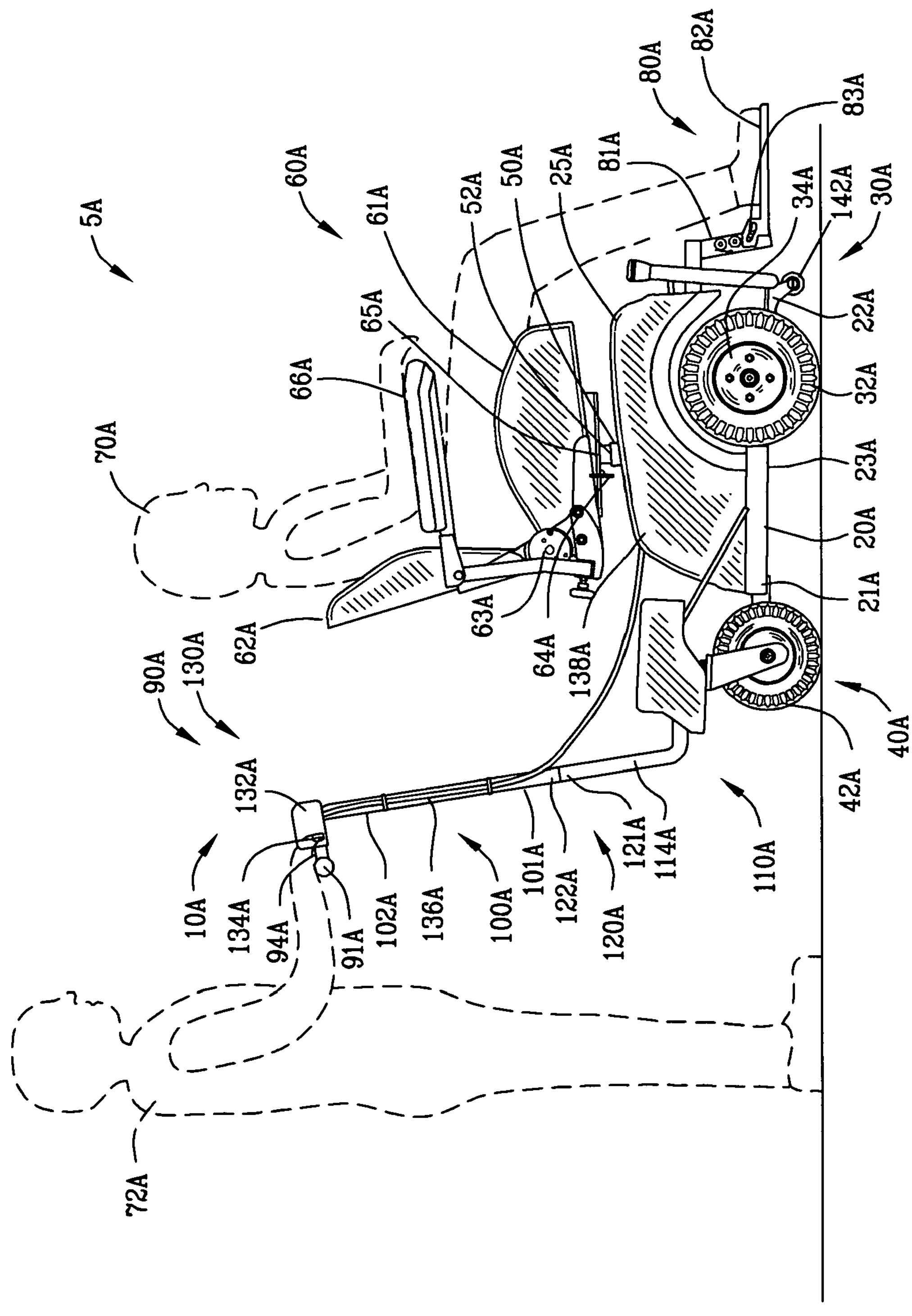
FIG. 11 is a side view of a second embodiment of a powered patient transport vehicle incorporating an improved motion control of the present invention.

FIG. 11 is a side view of a second embodiment of a powered patient transport vehicle 5A incorporating an improved motion control 10A of the present invention. In this example, the powered patient transport vehicle 5A comprises a frame 20A extending between a first frame end 21A and a second frame end 22A. A drive wheel assembly 30A comprises a right and left drive wheel 31A and 32A located in proximity to the second end 22A of the frame 20. A caster wheel assembly 40A comprising a right and a left caster wheel 41A and 42A is located in proximity to the first frame end 21A of the frame 20A. The steering bar 90A is secured to in proximity to the first end 21A of the frame 20A.

The steering bar 90A is mounted to the first frame end 21A of the frame 20A through an upstanding portion 100A and a frame mounting 110A through a coupling 120A in a manner similar to FIGS. 1-6. The second embodiment of a powered patient transport vehicle 5A provides a front wheel drive in contrast to the rear wheel drive shown in FIGS. 1-6.

The front wheel drive powered patient transport vehicle 5A shown in FIG. 11 is shown in FIG. 1. In addition, the front wheel drive powered patient transport vehicle 5A has more traction and accommodates larger obstacles such as larger curbs and larger bumps than the rear wheel drive powered patient transport vehicle 5. In contrast, the rear wheel drive powered patient transport vehicle 5 has better maneuverability than a front wheel drive powered patient transport vehicle 5A. Accordingly, the front wheel drive powered patient transport vehicle 5A is generally more suitable for outdoor use whereas the rear wheel drive powered patient transport vehicle 5 is generally more suitable for indoor use.

Figure 13:
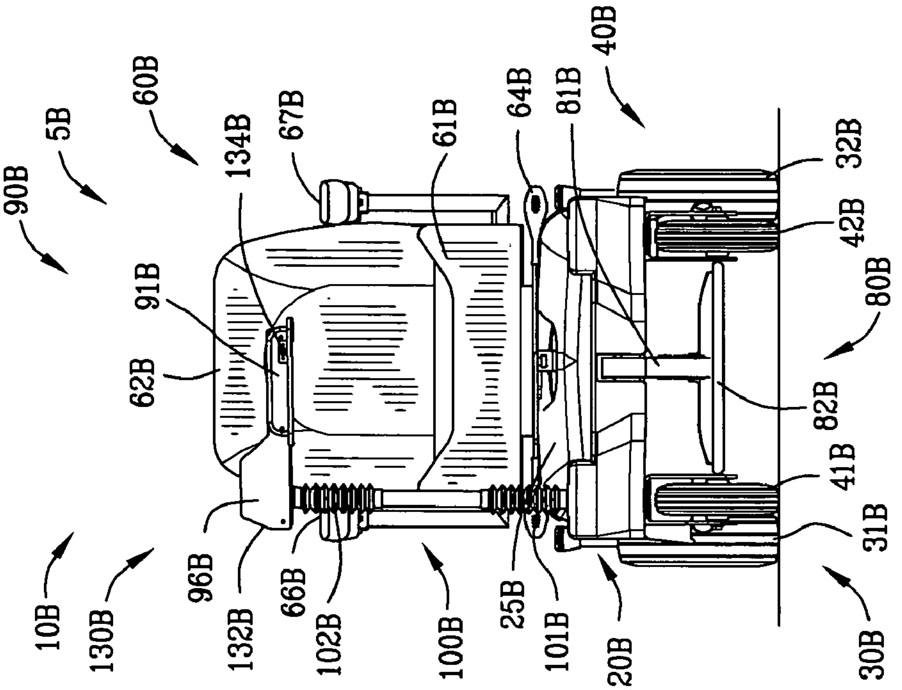
FIG. 13 is a front view of FIG. 12.
Figure 12:
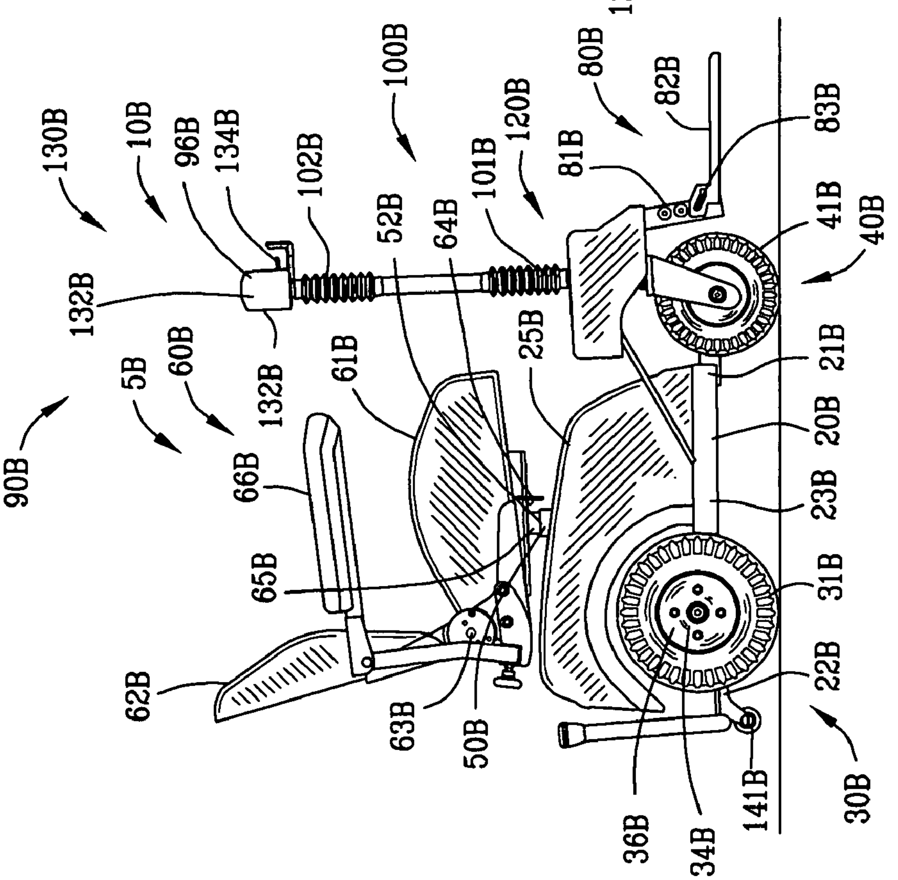
FIG. 12 is a side view of a third embodiment of a powered patient transport vehicle incorporating an improved motion control of the present invention.
Figure 14:
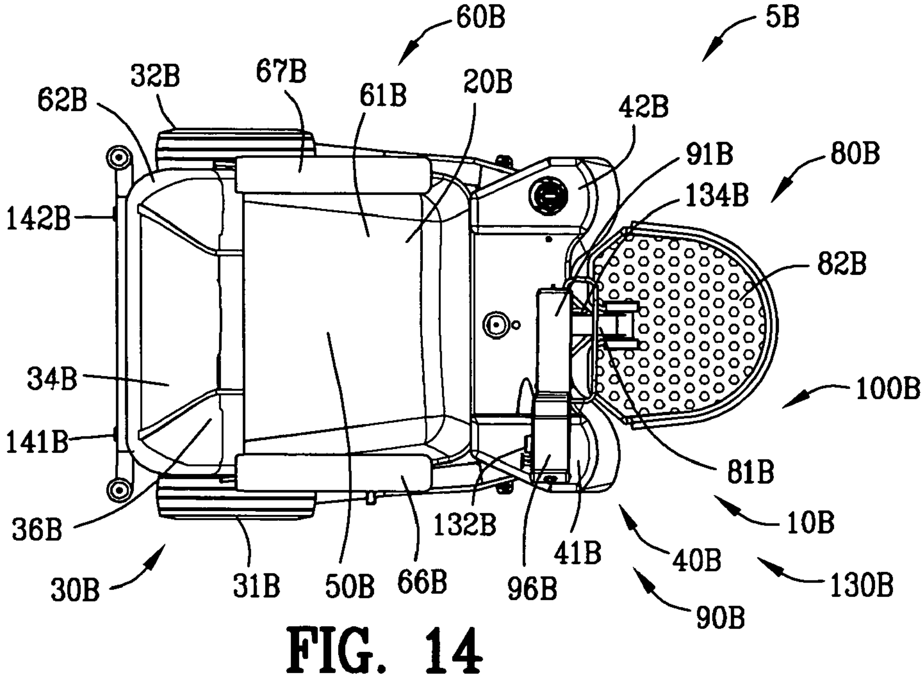
FIG. 14 is a top view of FIG. 12

FIGS. 12-14 are various views of a third embodiment of a powered patient transport vehicle 5B incorporating an improved motion control 10B of the present invention. The powered patient transport vehicle 5B comprises a frame 20B extending between a first frame end 21B and a second frame end 22B. A drive wheel assembly 30B comprises a right and a left drive wheel 31B and 32B located in proximity to the second end 22B of the frame 20B. A single drive motor 34B drives the right and left drive wheels 31B and 32B through a differential gearbox 36B in a manner similar to FIGS. 1-6. A caster wheel assembly 40B is located in proximity to the first frame end 21B of the frame 20B. The caster wheel assembly 40B comprises a right and a left caster wheel 41B and 42B. The right and left caster wheels 41B and 42B are shown as right and left caster wheels mounted by swivels to the first frame end 21B of the frame 20B.

A steering bar 90B is secured to the powered patient transport vehicle 5B for controlling the powered patient transport vehicle 5B. In this embodiment, the steering bar 90B comprises a hand gripping portion 91B defining a tiller 96B. An upstanding portion 100B extends between a lower end 101B and an upper end 102B. The tiller 96B is secured to the upper end 102B of the upstanding portion 100B with the hand gripping portion 91B extending outwardly therefrom. The lower end 101B of the upstanding portion 100B is secured one of the right and left casters 41B and 42B through a coupling 120B. The tiller 96B is fixed relative to the one of the right and left casters 41B and 42B for enabling the occupant 70B to turn the powered patient transport vehicle 5B.

An electronic control 130B includes a control console 132B having a control lever 134B located on the tiller 96B for controlling the speed, direction and braking of the drive motor 34B. Preferably, the electronic control 130 incorporates a forward direction speed function, a reverse direction speed function as well as a braking function of the drive motor 34B.

Figure 15:
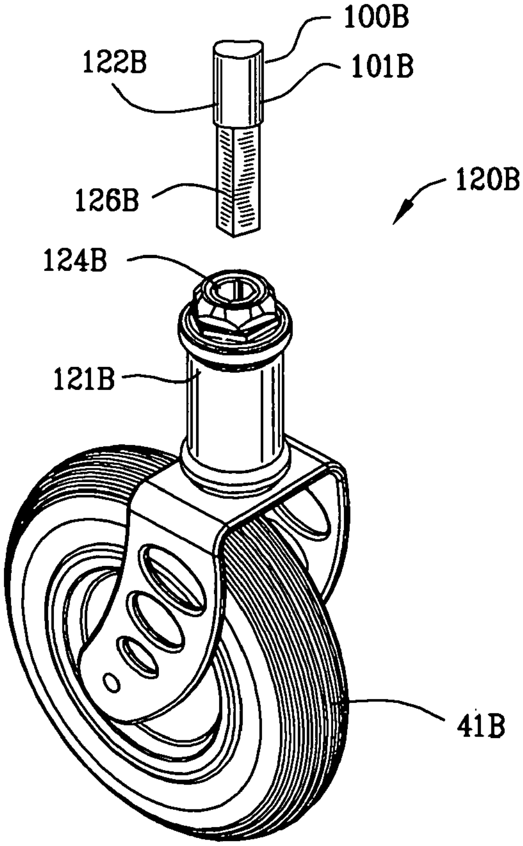
FIG. 15 is an enlarged isometric view of a caster coupling for connecting a tiller to a caster of the powered patient transport vehicle.

FIG. 15 is an enlarged isometric view the right caster wheels 41B and a caster coupling 120B for connecting the steering bar 90B to the right caster wheels 41B. The caster coupling 120B comprises a lower coupling portion 121B and an upper coupling portion 122B. The lower coupling portion 121B is secured to the right caster wheels 41B whereas the upper coupling portion 122B is defined in the lower end 101B of the upstanding member 100B.

In this example, the lower coupling portion 121B comprises a keyed aperture 124B whereas the upper coupling portion 122B comprises a keyed insert 126B. The keyed insert 126B is insertable into the keyed aperture 124B for connecting the steering bar 90B to the powered patient transport vehicle 5B.

Figure 16:
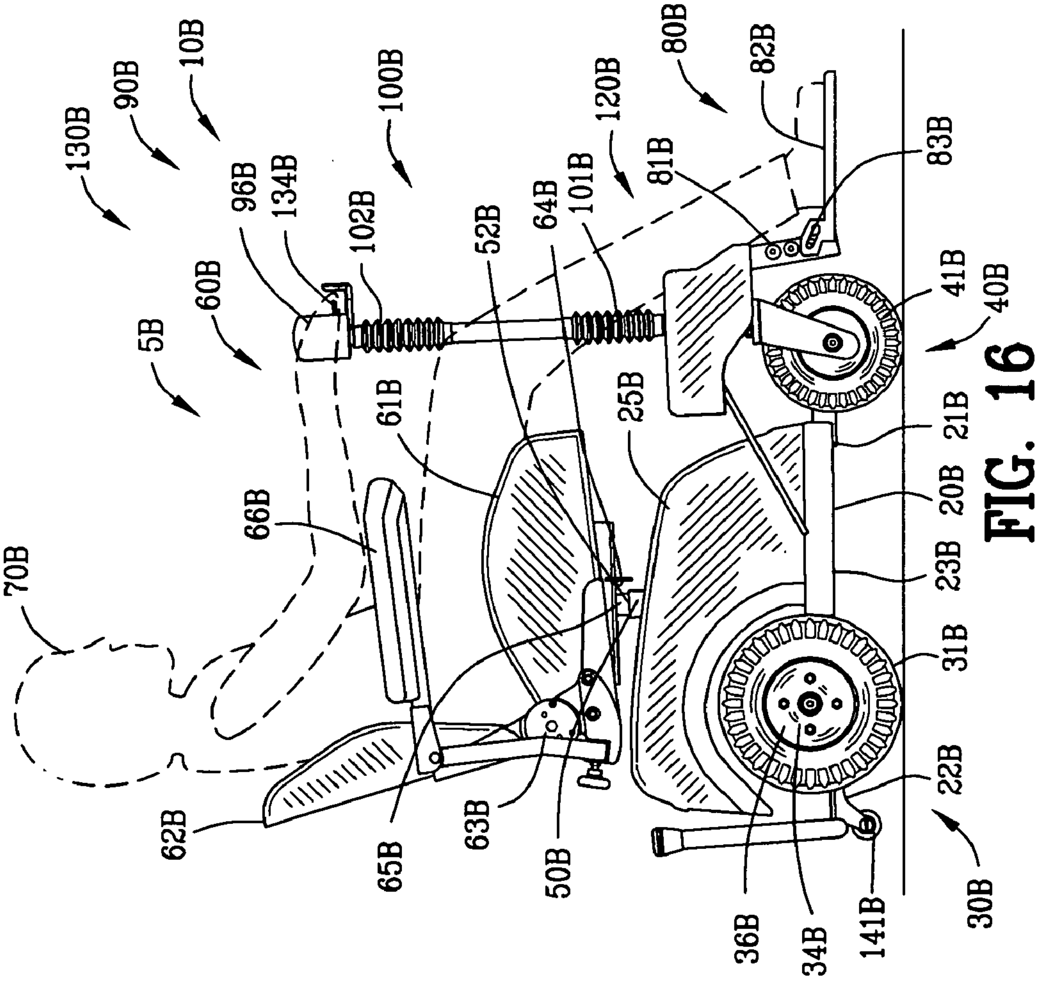
FIG. 16 is a side view similar to FIG. 12 illustrating an occupant seated in the powered patient transport vehicle with the occupant controlling the powered patient transport vehicle.

FIG. 16 is a side view similar to FIG. 12 illustrating an occupant 70B seated in the powered patient transport vehicle 5B with the occupant 70B controlling the powered patient transport vehicle 5B.

Figure 17:
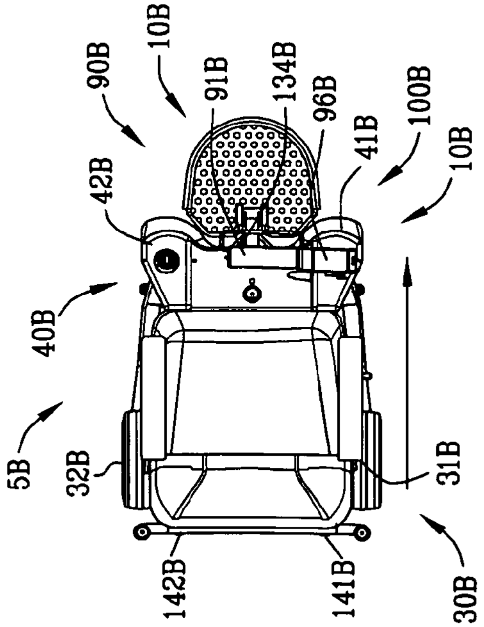
FIG. 17 is a top view of the powered patient transport vehicle of FIGS. 12-16 illustrating neutral force applied to the tiller of the powered patient transport vehicle for directing the powered patient transport vehicle in a straight direction.

FIG. 17 is a top view of the powered patient transport vehicle 5B of FIGS. 12-16 illustrating neutral force applied to the steering bar 90B of the powered patient transport vehicle 5B by the occupant 70B for directing the powered patient transport vehicle 5B in a straight direction.

Figure 18:
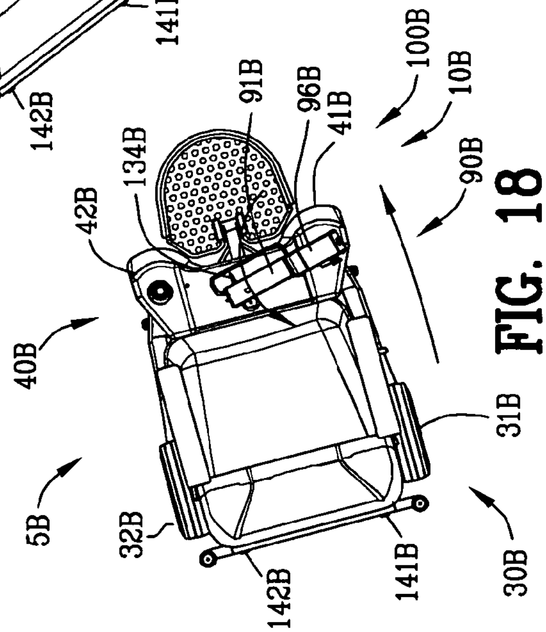
FIG. 18 is a top view similar to FIG. 17 illustrating a rotational force applied to the tiller of the powered patient transport vehicle for turning the powered patient transport vehicle.

FIG. 18 is a top view similar to FIG. 17 illustrating a rotational force applied to the steering bar 90B of the powered patient transport vehicle 5B by the occupant 70B for turning the powered patient transport vehicle 5B.

Figure 19:
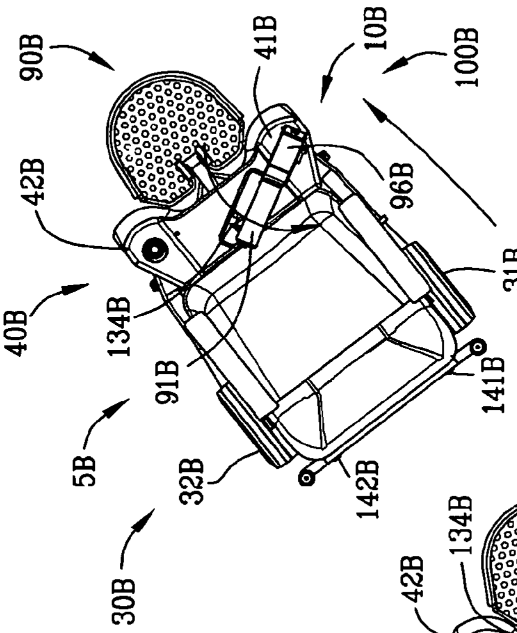
FIG. 19 is a top view similar to FIG. 18 illustrating a continued rotational force applied to the tiller of the powered patient transport vehicle for continued turning the powered patient transport vehicle.

FIG. 19 is a top view similar to FIG. 18 illustrating a continued rotational force applied to the steering bar 90B of the powered patient transport vehicle 5B by the occupant 70B for continued turning the powered patient transport vehicle 5B.

It should be appreciated by those skilled in the art that a powered patient transport vehicle may be fashioned to provide the attendant controlled powered patient transport vehicle 5 as shown in FIGS. 1-11 as well as the occupant controlled powered patient transport vehicle 5B as shown in FIGS. 12-19.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A powered patient transport vehicle having an improved motion control, comprising:

a frame extending between a first end and a second end;

a first and a second caster wheel located in proximity to said first end of said frame;

a first and a second drive wheel located in proximity to said second end of said frame;

a motor for driving said first and second drive wheels through a differential gearbox;

an electronic control having a control lever for controlling the speed, direction and braking of said motor;

a seat mounted to said frame for transporting an occupant;

an upstanding member extending between an upper end and a lower end;

a steering bar secured to said upper end of said upstanding member;

said control lever located on said steering bar for controlling the speed, direction and braking of the powered patient transport vehicle;

a coupling comprising an upper coupling portion defined on said lower end of said upstanding member and a lower coupling portion secured to said frame; and said upper coupling portion being removably engageable with said lower coupling portion for securing said steering bar to said powered patient transport vehicle for steering the powered patient transport vehicle;

wherein one of said lower and upper coupling portions comprises a keyed aperture whereas the other of the lower and upper coupling portions comprises a key for insertion into said keyed aperture for connecting said steering bar to the powered patient transport vehicle.

2. A powered patient transport vehicle as set forth in claim 1, wherein said coupling is located for enabling an attendant to steer the powered patient transport vehicle.

3. A powered patient transport vehicle as set forth in claim 1, wherein said coupling is located in, proximity to said second end of said frame.

4. A powered patient transport vehicle as set forth in claim 1, wherein said coupling is fixed relative to said frame for enabling said steering bar to steer the powered patient transport vehicle.

5. A powered patient transport vehicle as set forth in claim 1, wherein;

said lower coupling portion is secured to said frame in proximity to a level of an axle of said first and second drive wheels for enabling an attendant to push down on the steering bar for rotating the power patient transport vehicle about said first and second drive wheels to raise said first and second caster wheels to overcome an elevated obstruction.

6. A powered patient transport vehicle having an improved motion control, comprising:

a frame extending between a first end and a second end;

a first and a second caster wheel located in proximity to said first end of said frame;

a first and a second drive wheel located in proximity to said second end of said frame;

a motor for driving said first and second drive wheels on an axle through a differential gearbox;

a seat mounted to said frame for transporting an occupant;

a frame comprising a first and a second attachment member secured to said frame;

an intermediate member interconnecting the first and second attachment members for supporting a lower coupling portion;

an upstanding member extending between a lower end and an upper end;

a handlebar secured to said upper end of said upstanding member;

a control mounted on said handlebar for controlling the speed, direction and braking of said motor;

said upper coupling portion being engageable with said lower coupling portion for enabling an attendant to control the speed, direction and braking of the powered patient transport vehicle with the occupant therein; and said lower coupling portion is secured to said frame in proximity to a level of said axle of said first and second drive wheels for enabling an attendant to push down on the steering bar for rotating the power patient transport vehicle about said first and second drive wheels to raise said first and second caster wheels to overcome an elevated obstruction; wherein one of said lower and upper coupling portions comprises a keyed aperture whereas the other of the lower and upper coupling portions comprises a key for insertion into said keyed aperture for connecting said steering bar to the powered patient transport vehicle.

* * * * *